United States Patent [11] 3,625,960

[72] Inventor Nicola Maggi
 Milan, Italy
[21] Appl. No. 675,341
[22] Filed Oct. 16, 1967
[45] Patented Dec. 7, 1971
[73] Assignee Lepetit S.p.A.-Gruppo per la Ricerca
 Scientifica e la Produzione Chimica
 Farmaceutica
 Milan, Italy
[32] Priority Oct. 25, 1966
[33] Great Britain
[31] 47,899/66

[54] RIFAMYCIN SV DERIVATIVES
 7 Claims, No Drawings
[52] U.S. Cl. .................................................. 260/239.3,
 424/244, 424/285, 424/274, 424/273
[51] Int. Cl. .......................................................... C07d 87/54
[50] Field of Search ............................................. 260/239.3

[56] References Cited
UNITED STATES PATENTS

| | | | |
|---|---|---|---|
| 3,338,888 | 8/1967 | Bickel et al. ................... | 260/239.3 |
| 3,342,810 | 9/1967 | Maggi et al. ................... | 260/239.3 |
| 3,349,082 | 10/1967 | Maggi et al. ................... | 260/239.3 |

OTHER REFERENCES
 Fieser and Fieser, " Organic Chemistry," 3rd Ed., pp. 716–719 (Reinhold) (1956)

*Primary Examiner*—Henry R. Jiles
*Assistant Examiner*—Robert T. Bond
*Attorney*—Joseph Hirschmann ABSTRACT: The application discloses new rifamycin SV derivatives in which a sulfur atom links the rifamycin nucleus to radicals of various nature. A process for the preparation of the new derivatives, which show a high degree of antibacterial activity, is also disclosed.

RIFAMYCIN SV DERIVATIVES

The present invention concerns new derivatives of rifamycin SV wherein at position 3 a sulfur atom links the rifamycin nucleus to radicals of various kind. The general formula of the new compounds if the following

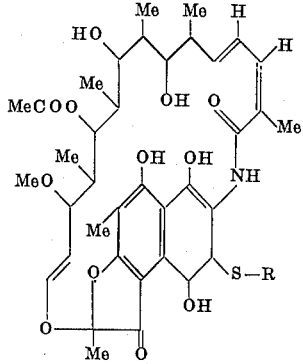

wherein R is a member of the class consisting of carboxyalkyl, aminoalkyl, di-lower alkylaminoalkyl, benzimidazolylethyl, 2-acetamidoethyl, pyrrolidinomethyl, 2-(carboxymethylcarbamyl)-2-(γ-amino-γcarboxypropionamido)-ethyl, guanidinoethyl groups.

The process for preparing this class of new compounds comprises the step of contacting rifamycin S with 1–2,5 equimolecular amounts of the selected compound containing a —SH group in its molecular structure, in an aqueous organic solvent. The mixture is allowed to react under stirring for 20–120 minutes in relation to the more or less marked reactivity of the reagent. Purification is accomplished by conventional routes.

The mechanism of the reaction consists in the addition of the thiol group to the rifamycin S, and in the simultaneous reduction of the quinone group contained in the rifamycin S molecule to hydroquinone. The process can therefore be represented by the following equation:

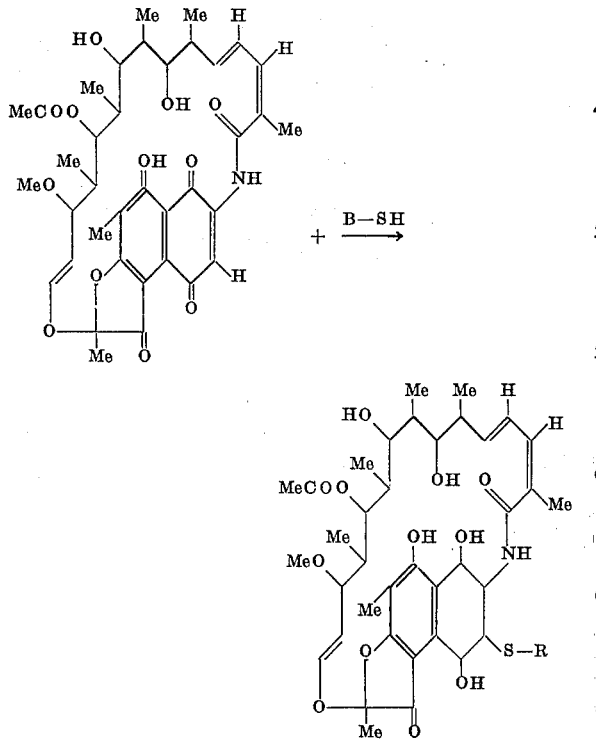

The chemical and physical properties of this class of compounds are in close connection with the ones of the family of rifamycins, and in particular rifamycin SV; these compounds are soluble in neutral or alkaline solutions.

The whole class of compounds shows a marked antibiotic activity especially against gram-positive bacteria. In the following table the minimal inhibitory concentration and the $ED_{50}$ of some compounds are given.

| R | Minimal inhibitory concentration in vitro, μg/ml. against— | | |
|---|---|---|---|
| | St. aureus | St. hemol. | M. tubercolosis |
| $-CH_2-CH_2NH_2$ | 0.005 | 0.05 | 0.5 |
| $-CH_2CH_2NH-COCH_3$ | 0.02 | 0.005 | 2 |
| $-CH_2-CH_2-$ (benzimidazolyl) | 0.05 | 0.01 | 0.5 |
| $-CH_2CH_2N(CH_3)_2$ | 0.01 | 0.01 | 0.05 |
| $-CH_2CH_2NHC(NH)(NH_2)$ | 0.1 | 0.05 | 1 |
| $-CH_2N$ (pyrrolidinyl) | 0.2 | 0.1 | 0.05 |

The following nonlimitative examples illustrate the invention.

EXAMPLE 1

Preparation of 3-glutathionyl-rifamycin SV

An amount of 3.5 g. (0.005 moles) of rifamycin S is dissolved in 50 ml. of tetrahydrofuran. This solution is cooled to 4–5° C. then a solution of 1.85 ml. (0.006 moles) of reduced glutathione dissolved in 25 ml. of water is added under stirring, which is prolonged for about 2 hours at 5° C. About 250ml. of water are then added, and the mixture is extracted twice with ethyl acetate to remove some small traces of rifamycin S and SV; then aqueous 10 percent hydrochloric acid is added (up to pH=2) and an extraction with butanol is carried out. The organic layer is concentrated in vacuo to 10 ml.; this solution is poured into 200 ml. of ligroin whereby a orange-yellow precipitate is formed. This is then collected on a filter, washed with ligroin and dried. It is then chromatographically purified on columns by solution in water made slightly alkaline (pH=7.5), and using water as the eluting solvent. The eluate is recovered, aqueous 3 percent ascorbic acid is added, the pH is adjusted to 2. An extraction is made with butanol and the organic layer, after concentration in vacuo, is poured into ligroin: the clear yellow precipitate is collected, washed with ligroin and dried in vacuo. Yield 2.4 g. (48 percent) of 3-glutathionyl-rifamycin SV ($C_{47}H_{62}N_4O_{18}S$) decomp. point 162° C.; λ max 320 and 450 μ.

EXAMPLE 2

Preparation of 3-(β-aminoethyl)-thio-rifamycin SV

To a stirred and cooled (2°–4°C.) solution of 2.4 g. (0.021 moles) of mercaptoethylamine hydrochloride in 35 ml. of aqueous 10 percent tetra-hydrofuran, a cooled solution of 7 g. (0.01 moles) of rifamycin S and 2.8 ml. (0.02 moles) of triethylamine in 15 ml. of tetrahydrofuran is added dropwise. A precipitate is soon observed; precipitation is completed within 20 minutes, maintaining the mixture to the above cited temperature. The orange-yellow product is collected, washed with tetrahydrofuran and dried. A recrystallization from acetone yields 5.5 g. of pure product (70 percent); it is 3-(β-amino-ethyl)-thiorifamycin SV, $C_{39}H_{52}N_2O_{12}S$; decomposition point 185° C., λ max 320 and 454 μ.

EXAMPLES 3–8

The following compounds were prepared as described in example 2. The reaction time and temperature are given.

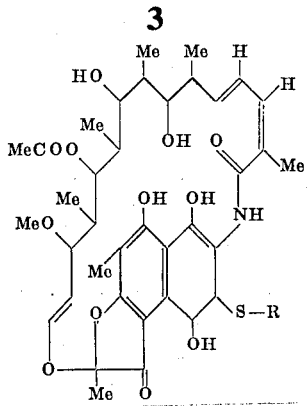

wherein R is a member of the class consisting of carboxy-lower alkyl, amino-lower alkyl, di-lower alkylamino-lower alkyl, benzimidazolylethyl, 2-acetamidoethyl, pyrrolidinomethyl, 2-(carboxymethylcarbamyl)-2(γ-amino-γ-carboxypropionamido)-ethyl and guanidinoethyl groups.

2. A compound as in claim 1, wherein the group substituted at position 3 of rifamycin SV is

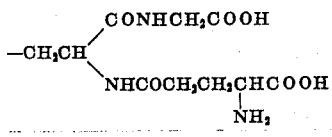

| Ex. | R | Reaction time (minutes) | Temperature | Decomposition point, °C. | $\lambda_{max}$. m$\mu$. |
|---|---|---|---|---|---|
| 3 | —CH$_2$—COOH | 40 | 10 | 168–169 | 320 and 454. |
| 4 | —(CH$_2$)$_2$—COOH | 40 | 10 | 125 | 320 and 454. |
| 5 | —CH$_2$CH$_2$NHCOCH$_3$ | 20 | 25 | 171 | 320 and 440. |
| 6 | —CH$_2$N⟨ ⟩ | 30 | 20 | 230 | 318 and 450. |
| 7 | —CH$_2$CH$_2$NH—C—NH$_2$ ‖ NH | 20 | 5 | 220 | 319 and 451. |
| 8 | —CH$_2$—CH$_2$— (benzimidazolyl) | 20 | 10 | 152–155 | 325 and 455. |
| 9 | —CH$_2$CH$_2$N(CH$_3$)$_2$ | 20 | 5 | 180–182 | 320 and 450. |

We claim:
1. A compound of the formula

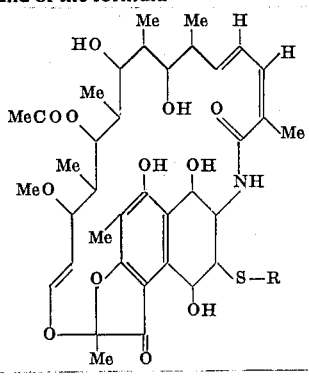

3. A compound as in claim 1, wherein the group substituted at position 3 of rifamycin SV is the 2-aminoethyl group.

4. A compound as in claim 1, wherein the group substituted at position 3 of rifamycin SV is the 2-dimethylaminoethyl group.

5. A compound as in claim 1, wherein the group substituted at position 3 of rifamycin SV is the 2-guanidinoethyl group.

6. A compound as in claim 1 wherein R is 2-acetamidoethyl.

7. A compound as in claim 1 wherein R is pyrrolidinomethyl.

* * * * *